(12) United States Patent
Haraikawa

(10) Patent No.: US 10,866,677 B2
(45) Date of Patent: Dec. 15, 2020

(54) ELECTRONIC DEVICE EQUIPPED WITH TOUCH PANEL AND UPDATE METHOD OF BASE LINE VALUE

(71) Applicant: ALPINE ELECTRONICS, INC., Tokyo (JP)

(72) Inventor: Yuki Haraikawa, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/665,362

(22) Filed: Oct. 28, 2019

(65) Prior Publication Data

US 2020/0150819 A1 May 14, 2020

(30) Foreign Application Priority Data

Nov. 14, 2018 (JP) ................................ 2018-213385

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04101* (2013.01)

(58) Field of Classification Search
CPC .. G06F 3/0416; G06F 3/04166; G06F 3/4018; G06F 3/04182; G06F 3/04184;
(Continued)

(56) References Cited

U.S. PATENT DOCUMENTS 8,575,988 B2 * 11/2013 Erdogan ............ G01R 27/2605
327/336
2012/0050180 A1 * 3/2012 King ..................... G06F 3/0416
345/173
(Continued)

FOREIGN PATENT DOCUMENTS

EP          3 106 970       12/2016
JP         2010-257046      11/2010
(Continued)

OTHER PUBLICATIONS

Extended European Search Report for 19208854.0 dated Mar. 13, 2020, 10 pgs.

*Primary Examiner* — Laurence J Lee
(74) *Attorney, Agent, or Firm* — Brinks Gilson & Lione

(57) ABSTRACT

A touch panel device includes a touch panel which is equipped with a plurality of electrostatic capacitive sensors of which the electrostatic capacitances vary as an object comes close to, or comes into contact with, the touch panel. A measurement unit measures the electrostatic capacitance of the electrostatic capacitive sensor, and a touch detection unit detects an object coming close to, or coming into contact with, the touch panel on the basis of a difference between a measured raw value and a base line value. A base line value update unit updates the base line value to follow the raw value of the electrostatic capacitance of the electrostatic capacitive sensor to correct a variance in electrostatic capacitance of the electrostatic capacitive sensor. A proximity detection unit detects an object approaching the touch panel, and an update control unit controls the update speed on the basis of a detection result of the proximity detection unit.

14 Claims, 8 Drawing Sheets

(58) Field of Classification Search
CPC ............... G06F 3/04186; G06F 3/044; G06F 2203/04101; G06F 2203/04108
See application file for complete search history.

(56) References Cited

U.S. PATENT DOCUMENTS

| | | |
|---|---|---|
| 2014/0071085 A1 | 3/2014 | Kasamatsu |
| 2016/0231860 A1* | 8/2016 | Elia .................. G06F 3/044 |
| 2020/0050341 A1* | 2/2020 | Tabata ............... G06F 3/0446 |

FOREIGN PATENT DOCUMENTS

| | | |
|---|---|---|
| JP | 2014-56512 | 3/2014 |
| JP | 2018-116631 | 7/2018 |
| WO | WO 2018/193711 | 10/2018 |

\* cited by examiner

ELECTRONIC DEVICE EQUIPPED WITH TOUCH PANEL AND UPDATE METHOD OF BASE LINE VALUE

RELATED APPLICATION

The present application claims priority to Japanese Patent Application Number 2018-213385, filed Nov. 14, 2018, the entirety of which is hereby incorporated by reference.

BACKGROUND

1. Field of the Invention

The present invention relates to a touch panel in which an electrostatic capacitive sensor is mounted, and particularly to an update method of a base line value (reference value) which is used to detect a touch operation.

2. Description of the Related Art

A touch panel is a user interface which is used in various fields such as a smart phone, a tablet terminal, and a shop counter of commercial facilities. There are various methods for detecting a touch operation. For example, there is a method for detecting an electrostatic capacitance which varies when a user's finger comes close or comes into contact, and a method for detecting the approach of a finger by enclosing a light beam such as infrared rays around the touch panel.

In general, in the touch panel using the method of detecting the electrostatic capacitance, a touch is detected by determining whether a difference between a measured raw value of an electrostatic capacitive sensor and the base line value (reference value) is equal to or more than a threshold. However, the electrostatic capacitive sensor varies in the electrostatic capacitance according to an ambient temperature change. Therefore, there is a need to update and reset the base line value in order to cancel a variation caused by a temperature change. JP 2010-257046 A discloses an approach detection device in order to prevent an erroneous resetting when a finger comes close or comes into contact. In a case where it is determined that a finger is not in a contact state, it is determined that a finger does not come close on the basis of a differential value distribution, and the electrostatic capacitance is updated to a new base line value. In a case where it is determined that a finger is in the contact state, the contact state of the finger is determined on the basis of the differential value distribution, and the base line value is not updated.

In addition, JP 2014-056512 A discloses an electronic device which includes a touch panel. In a case where it is determined that a difference between the measured raw value and the reference value (base line value) is larger than a threshold, a portion corresponding to an electrode is detected as a touch position. After the detection, in a case where the difference is maintained for a predetermined time, the measurement value is updated to the reference value. JP 2018-116631 A discloses a touch detection device. A touch determination threshold ONth and a non-touch determination threshold OFFth are set with respect to a reference value Ref and compared with the detection capacitance C of the electrostatic capacitance, so that the touch and the non-touch are determined. If a capacitance variance ΔC is less than the non-touch determination threshold OFFth, the reference value Ref is updated. If the capacitance variance is equal to or more than the non-touch determination threshold OFFth, the updating of the reference value Ref is stopped.

As described above, the touch panel using the electrostatic capacitive sensor uses a difference (Diff) between the raw value of the electrostatic capacitive sensor and the base line value (reference value) as sensitivity. For example, a touch is detected by detecting whether the difference is equal to or more than the threshold. In addition, the electrostatic capacitance of the electrostatic capacitive sensor varies according to an ambient temperature. Therefore, as a means for correcting the electrostatic capacitance, the base line value is updated such that the base line value follows the variance of the electrostatic capacitance. However, there is a need to keep the detection state during the touch detection. Since the base line value is used for the comparison with the raw value, the update of the base line value is stopped.

Recently, technologies have emerged that allow electrostatic touch operation without touching the screen. These technologies are called Hover, and Hover needs to detect more minute capacitance changes than conventional electrostatic touch. For example, in a case where the touch operation continues immediately after a cold start of a product or in the middle of a steep variation of an ambient temperature, the update of the base line value is stopped during the touch detection and the electrostatic capacitance variation, and a difference (Diff) in the varying electrostatic capacitance is generated at the time of a touch release which has not occurred in the related art. Therefore, the degradation in performance of Hover is caused, or a minute capacitance variation is not possible to be detected.

FIG. 1 is a graph for describing the problem in the related art described above. The vertical axis represents capacitance, and the horizontal axis represents time. The raw value is a measurement value of the electrostatic capacitive sensor. The touch panel is activated at Time t0, the raw value is increased as the temperature is increased from Time t0 to Time t2, and the base line value is updated to follow the increase. The touch operation is performed at Time t2, and the touch detection is performed during a period from Time t2 to Time t3. The increase of the raw value caused by the increase of temperature during the touch detection is illustrated with a broken line. The solid line is the raw value caused by a touched finger and the increase of temperature. In addition, the detection state is should be maintained during the touch period, so that the base line value is not updated. Therefore, at the time of the touch release at Time t3, a varied capacitance ΔC is reflected on the difference (Diff) between the base line value and the raw value. Thereafter, the update of the base line value starts, and the difference from the raw value is gradually reduced. At Time t3 or later, an object such as a finger does not exist near the touch panel. However, if the difference (Diff) is equal to or more than the threshold, an erroneous detection of the touch operation may be caused, or a Hover distance may be degraded.

As a countermeasure, there is a process that the difference (Diff) when a touch is not detected after the touch is released is reset to "0" after a time elapses. In the example of FIG. 1, the base line value is recovered during a certain time period from Time t3 such that the difference becomes "0". A recovery time for recovering the base line value is proportional to an update speed of the base line value. In other words, if the update speed of the base line value is fast, the recovery time becomes also fast. On the other hand, in an operation that a finger slowly approaches the screen, a capacitance change per unit time is small, so that the detection becomes difficult.

SUMMARY

The invention has been made in view of the above problem in the related art, and an object thereof is to provide an electronic device and an update method of the base line value which can detect a minute capacitance variation while controlling the update speed of the base line value.

An electronic device according to the present disclosure is equipped with a touch panel. The electronic device includes a plurality of electrostatic capacitive sensors which are disposed in the touch panel, and an electrostatic capacitance of the electrostatic capacitive sensor varies as an object comes close or comes into contact, a measurement unit which measures the electrostatic capacitance of the electrostatic capacitive sensor, a first detection unit which detects whether the object comes close or comes into contact on the basis of a difference between a measurement value of the measured electrostatic capacitance and a base line value, an update unit which updates the base line value to cause the base line value to follow the measurement value of the electrostatic capacitance to correct a variation in electrostatic capacitance of the electrostatic capacitive sensor, a second detection unit which detects an approaching object to the touch panel, and a control unit which controls an update speed of the update unit on the basis of a detection result of the second detection unit.

In an embodiment, the control unit may set the update speed of the base line value by the update unit to a slow speed when the second detection unit detects an approaching object. The control unit may set the update speed of the base line value by the update unit to a fast speed when the second detection unit does not detect an approaching object. The control unit further may set the update speed of the base line value by the update unit to a fast speed when a number of times of non-detection of the object by the second detection unit reaches a certain number of times. The control unit may set the update speed of the base line value by the update unit to a slow speed as an initial setting. The update unit may stop the updating of the base line value during a period when an object coming close or coming into contact is being detected by the first detection unit. The control unit may set the update speed of the base line value by the update unit to a slow speed after the detection by the first detection unit is performed, and switch the update speed from the slow speed to the fast speed when the second detection unit does not detect the object. The update unit may set a variation rate of the base line value to be smooth when the update speed is set to be slow, and set the variation rate of the base line value to be steep when the update speed is set to be fast. A second distance from the touch panel at which the second detection unit is possible to detect may be larger than a first distance from the touch panel at which the first detection unit is possible to detect. The second detection unit may detect an approaching object by an infrared sensor which includes a light-emitting element and a light-receiving element. The second detection unit may detect an approaching object from a video captured by an image pickup camera. The touch panel device may further include a display unit which displays an image related to the touch panel. The control unit may control the image to be displayed by the display unit on the basis of the detection result of the second detection unit.

An update method of the base line value according to the present disclosure is performed in a touch panel in which a plurality of electrostatic capacitive sensors are disposed and an electrostatic capacitance of the electrostatic capacitive sensor varies as an object comes close or comes into contact. The update method includes a step of measuring the electrostatic capacitance of the electrostatic capacitive sensor, a first detection step of detecting an object which comes close or comes into contact on the basis of a difference between a measurement value of the measured electrostatic capacitance and the base line value, a step of updating the base line value by causing the base line value to follow the measurement value of the electrostatic capacitance of the electrostatic capacitive sensor to correct a variance in electrostatic capacitance of the electrostatic capacitive sensor, a second detection step of detecting an approaching object to the touch panel, and a step of controlling an update speed of the base line value on the basis of a detection result of the second detection step.

According to the present disclosure, an update speed of a base line value is controlled according to whether an object approaches the touch panel. Therefore, the detection of a slow approach to the touch panel and a fast recovery time of the base line value can be compatible.

DETAILED DESCRIPTION

Next, embodiments of the invention will be described. An electronic device is provided with a touch panel equipped with an electrostatic capacitive sensor, and the touch panel is a user interface which detects whether an object such as a finger or a pen comes close to or comes into contact with the touch panel, and provides a detected coordinate position. The electronic device equipped with the touch panel may be an in-vehicle device which has a car navigation function and an audio visual function, a smart phone, a tablet terminal, or a computer device. In the following embodiments, a touch panel device will be used as an example.

[Embodiments]

Figure 1:
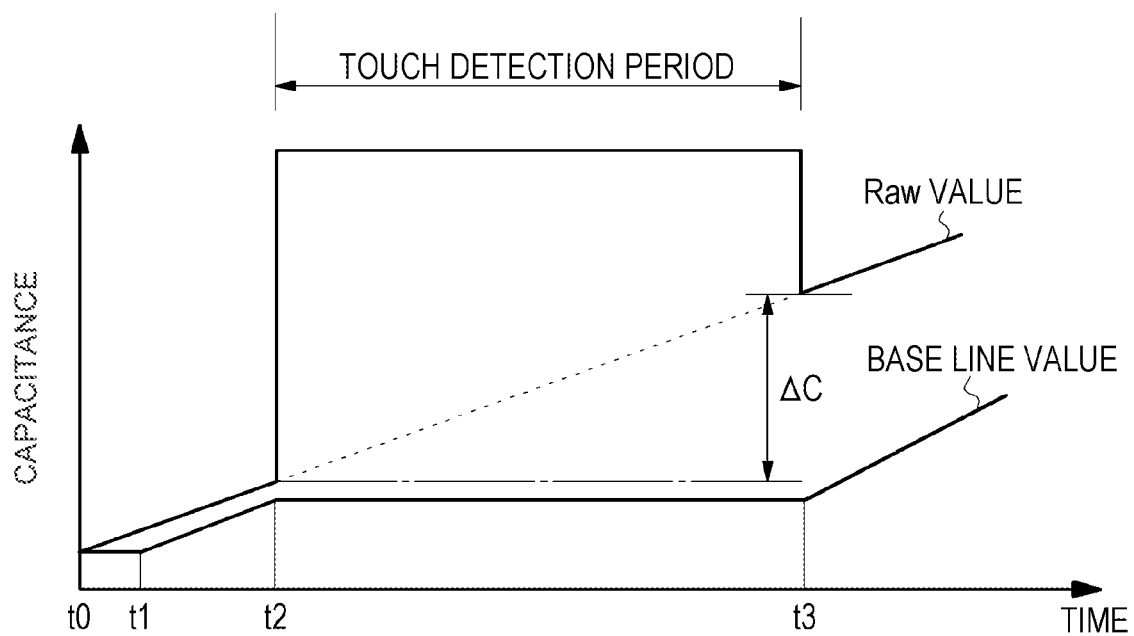
FIG. 1 is a graph for describing a problem of a touch panel device of the related art.
Figure 2:
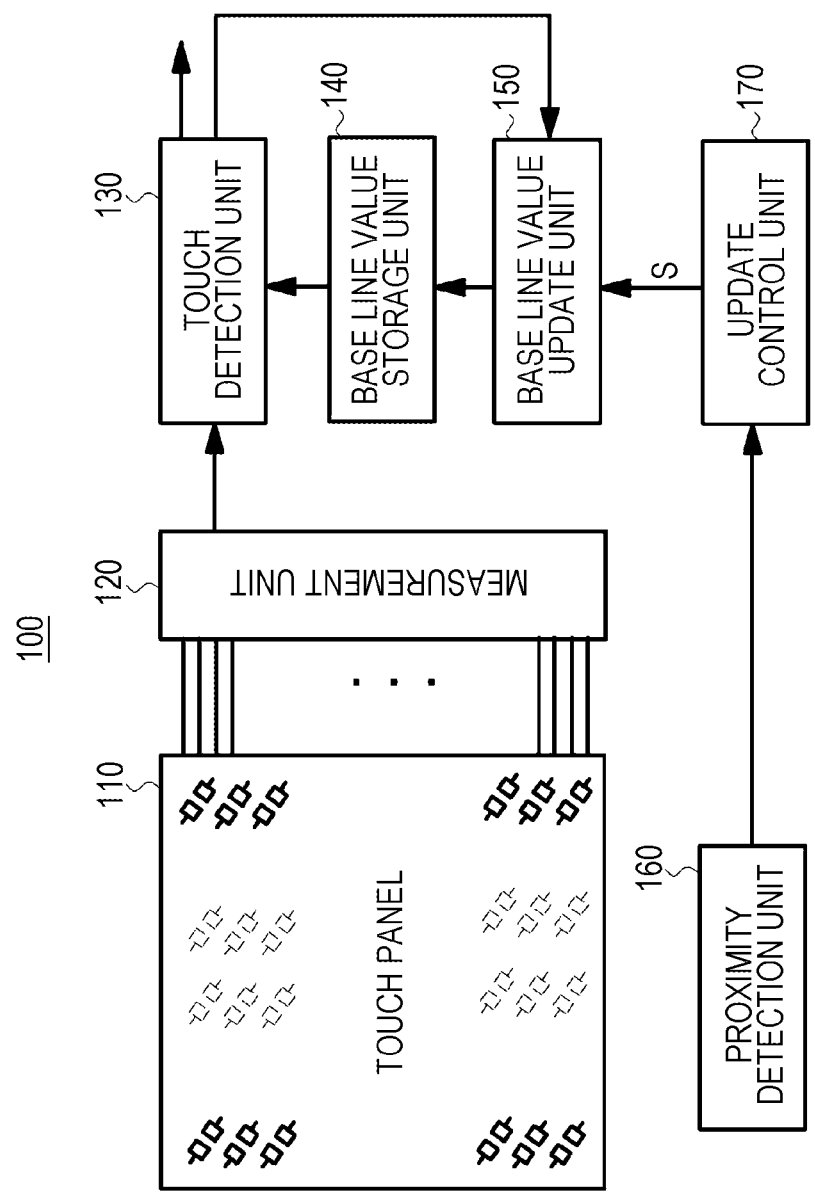
FIG. 2 is a block diagram illustrating a configuration of a touch panel device according to a first embodiment of the invention.

FIG. 2 is a block diagram illustrating a configuration of a touch panel device according to a first embodiment of the invention. A touch panel device 100 according to this embodiment includes a touch panel 110 in which a plurality of electrostatic capacitive sensors are disposed at a certain pitch in row and column directions, a measurement unit 120 which measures an electrostatic capacitance of each of the plurality of electrostatic capacitive sensors, a touch detection unit 130 which detects whether a touch operation is performed on the basis of a difference between a raw value measured by the measurement unit 120 and a base line value, a base line value storage unit 140 which stores the base line value, a base line value update unit 150 which updates the base line value to follow the raw value of the electrostatic capacitance to correct a variation in electrostatic capacitance caused by a temperature change in the electrostatic capacitive sensor, a proximity detection unit 160 which detects an approaching object such as a finger to the touch panel 110, and an update control unit 170 which controls an update speed of the base line value by the base line value update unit 150 on the basis of a detection result of the proximity detection unit 160.

In general, the touch panel 110 is stacked on a display medium such as a liquid crystal panel, and forms a display unit which includes a user interface. An image displayed in a liquid crystal panel or the like penetrates the touch panel 110, and a user views the image and performs a desired input operation on the touch panel 110. The plurality of electrostatic capacitive sensors disposed in a matrix shape is mounted in the touch panel 110. If an object such as a finger comes close or comes into contact, the electrostatic capacitance of the electrostatic capacitive sensor varies accordingly.

The measurement unit 120 is electrically connected to each electrostatic capacitive sensor of the touch panel 110. The measurement unit 120 scans the electrostatic capacitive sensors in an X direction at a certain frequency for example, repeatedly performs the scanning in a Y direction to scan all the electrostatic capacitive sensors of the touch panel 110, and sequentially measures the electrostatic capacitance of each of the plurality of electrostatic capacitive sensors. A measurement result of the measurement unit 120 is output to the touch detection unit 130.

The touch detection unit 130 obtains a difference between the raw value measured by the measurement unit 120 and the base line value, compares the difference (Diff) with a threshold, and detects whether a touch operation is made. For example, if the difference is equal to or more than the threshold, a touch operation is detected. If the difference is less than the threshold, no touch operation is detected. A detection result of the touch detection unit 130 is provided to a control unit (not illustrated). The control unit processes the detection result of the touch operation as a user input.

A base line value storage unit 140 stores the base line value related to the electrostatic capacitive sensor. A plurality of the base line values may be prepared in association with the plurality of electrostatic capacitive sensors, or may be prepared in association with one or some of the electrostatic capacitive sensors. When the touch detection is performed, the touch detection unit 130 reads the base line value related to the electrostatic capacitive sensor of the detection target from the base line value storage unit 140.

The base line value update unit 150 updates the base line value stored in the base line value storage unit 140 to correct the variation in electrostatic capacitance of the electrostatic capacitive sensor. In an embodiment, the base line value update unit 150 updates the base line value to the measured raw value in a case where the touch operation is detected and the difference is kept for a certain time period. In addition, the base line value update unit 150 stops the updating of the base line value during a period when the touch detection unit 130 performs the touch detection. In this embodiment, the update speed of the base line value by the base line value update unit 150 is controlled by an update control signal S from the update control unit 170 as described below.

The proximity detection unit 160 detects an approaching object, such as a user's finger to the touch panel 110, and outputs the detection result to the update control unit 170. The touch detection unit 130 detects that the object comes close to or comes into contact with the touch panel 110. The proximity detection unit 160 detects an approaching object in an area separated from the touch panel 110 from a detection range of the touch detection unit 130. The proximity detection unit 160 detects whether there is an approaching object, for example, at a certain frequency. The detection period may be synchronized with the detection period of the touch detection unit 130. In addition, in an embodiment, the proximity detection unit 160 may detect an approaching object during the entire operation period of the touch panel device 100, or may detect an approaching object in a predetermined period (for example, a certain period from immediately after a cold start of a product, a period when an ambient temperature steeply varies, or a certain period from immediately after the touch detection unit 130 detects a touch).

The proximity detection unit 160 may be configured as known in the art. In one embodiment, the proximity detection unit 160 detects an approaching object using an infrared (IR) sensor. The infrared sensor is configured by a light-emitting element which emits infrared and a light-receiving element which receives the reflected light of the emitted infrared. One or a plurality of infrared sensors are provided around the touch panel 110 to detect whether there is an object approaching the touch panel 110. In addition, in another embodiment, the proximity detection unit 160 detects an approaching object using an image pickup camera. In this case, the image pickup camera captures the image of the touch panel 110 and analyzes the data of the captured image to detect whether there is an approaching object.

Figure 3:
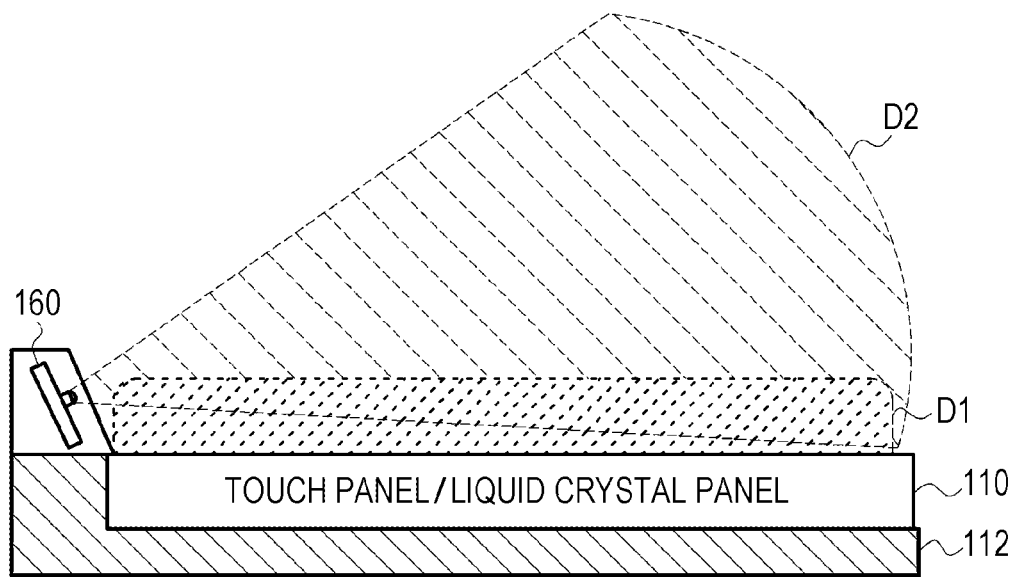
FIG. 3 is a diagram for describing a detection area of an object of the touch panel device according to the first embodiment of the invention.

FIG. 3 schematically illustrates a detection range D1 by the touch detection unit 130 and a detection range D2 by the proximity detection unit 160. The touch panel 110 is stacked on a liquid crystal panel or the like, and the display unit is supported by a support substrate 112. For example, an IR sensor is attached as the proximity detection unit 160 in the side portion of the touch panel 110. The detection range D1 by the touch detection unit 130 detects whether there is an object within a near-distance range from the touch panel 110. The detection range D2 by the proximity detection unit 160 detects whether there is an object within a range of a distance further away from the touch panel 110.

The update control unit 170 outputs, to the base line value update unit 150, the update control signal S for controlling the update speed of the base line value based on the detection result of the proximity detection unit 160. Specifically, in a case where an approaching object is detected by the proximity detection unit 160, the update control unit 170 outputs the update control signal S to set the update speed of the base line value to be slow. In a case where an approaching object is not detected by the proximity detection unit 160, the update control signal S is output to set the update speed of the base line value to be fast. In addition, in the initial setting, the update control unit 170 outputs the update control signal S to set the update speed to be slow.

The base line value update unit 150 determines the update speed according to the update control signal S. For example, in a case where the update speed is set to be slow, a variation of the base line value is set to be slower than a certain value (for example, the certain value is a normal variation when the temperature variation is corrected). In a case where the update speed is set to be fast, the variation of the base line value is set to be faster than the certain value. For example, in a case where the update speed is fast, a variation Δ is added or subtracted with respect to the original base line value at every 1 millisecond. In a case where the update speed is set to be slow, the variation Δ is added or subtracted with respect to the original base line value at every 12 milliseconds. At this time, the normal update speed according to the temperature variation of an electrostatic capacitive sensor is adjusted by adding or subtracting the variation Δ with respect to the original base line value at every 6 milliseconds.

Figure 4:
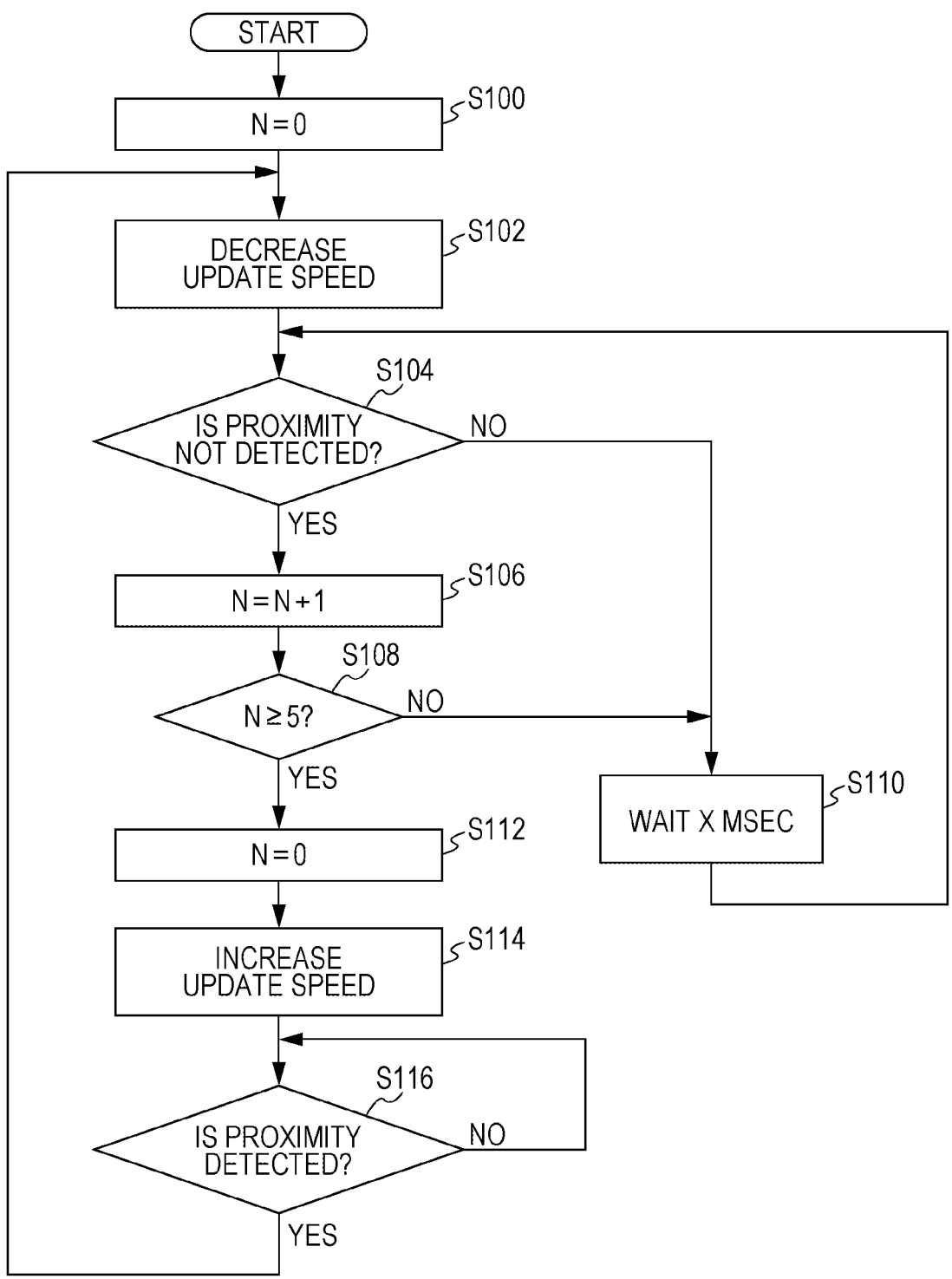
FIG. 4 is a flowchart for describing an update operation of a base line value of the touch panel device according to the first embodiment of the invention.

Next, an update operation of the base line value of this embodiment will be described with reference to the flowchart of FIG. 4. First, the update control unit 170 sets a counter value N obtained by counting the number of times of non-detection of an approaching object by the proximity detection unit 160 to zero as an initial setting (Step S100), and outputs the update control signal S to the base line value update unit 150 to set the update speed to be slow. In other words, the update speed is initially set to a state where an object is detected in the vicinity of the touch panel 110 by the proximity detection unit 160.

Next, the update control unit 170 receives the detection result of the proximity detection unit 160. If the approaching is not detected (S104), the counter value N is increased by 1 (S106), and it is determined whether the counter value N reaches a predetermined number of times (S108). Here, the predetermined number of times is "5".

If an approaching object is not detected by the proximity detection unit 160 (S104), and the counter value N does not reach "5" (S108), the update control unit 170 receives the next detection result from the proximity detection unit 160 after waiting for X milliseconds (S110). The standby time of X milliseconds is equal to the detection period of the proximity detection unit 160 for example.

The processes of Steps S104 to S110 are repeatedly performed. If the counter value N of the non-detection of an approaching object reaches "5" (S108), the update control unit 170 determines that there is no object in the vicinity of the touch panel 110, resets the counter value N to zero (S112), and outputs the update control signal S to the base line value update unit 150 to set the update speed of the base line value to be fast (S114). The base line value update unit 150 switches the update speed from slow to fast in response to the update control signal S.

Thereafter, the update control unit 170 monitors the detection result of the proximity detection unit 160. If a new approaching object is detected by the proximity detection unit 160 (S116), the update control signal S is output to the base line value update unit 150 to set the update speed to be slow. The base line value update unit 150 switches the update speed from fast to slow in response to the update control signal S (S102).

Figure 5:
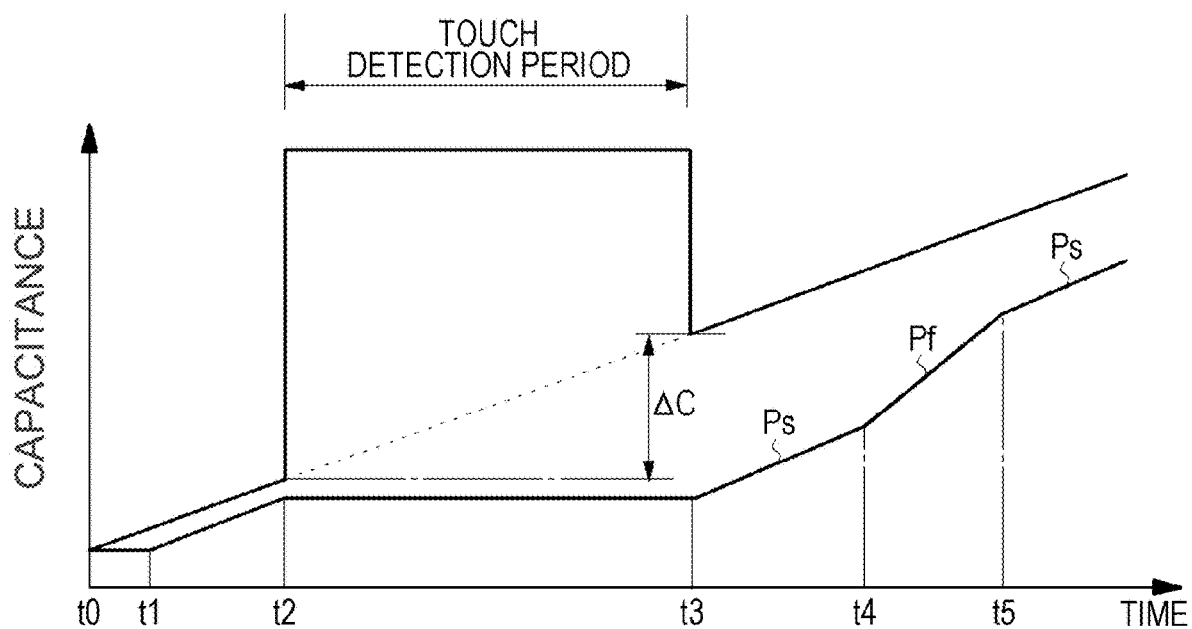
FIG. 5 is a graph illustrating an example of switching an update speed of the base line value according to the first embodiment of the invention.

FIG. 5 illustrates an example of switching the update speed of the base line value according to this embodiment. At Time t3, a touch release or a touch detection period ends. The update speed at this time is set to be slow as the initial setting. Therefore, if the electrostatic capacitance of the electrostatic capacitive sensor (Raw) is increased, an increase rate of the base line value is set to be slow, and an inclination Ps thereof is relatively small compared to that of the base line value when the update speed is fast. This assumes it is possible that a user's finger approaches the touch panel again immediately after the touch release. If the base line value is changed steeply, a minute variance of capacitance per unit time is absorbed. The finger is difficult to be detected when the finger approaches the screen. In order to prevent such a situation, the update speed at the time of the touch release is set to be slow.

At Time t4, in a case where the number of times of non-detection by the proximity detection unit 160 reaches 5 times, the update control unit 170 detects that there is no object in the vicinity of the touch panel 110, and switches the update speed from slow to fast. Therefore, the increasing rate of the base line value is fast, and the inclination Pf thereof becomes larger than that of the slow update speed. Since there is no object in the vicinity of the touch panel 110, and there is no need to detect a minute variance in capacitance, the difference (Diff) between the base line value and the electrostatic capacitance (Raw) can be recovered to an appropriate value as fast as possible.

At Time t5, if an approaching object is detected again by the proximity detection unit 160, the update control unit 170 determines that there is an object in the vicinity of the touch panel 110, and switches the update speed from fast to slow in order to detect a minute variation in capacitance.

In this way, according to this embodiment, the update speed of the base line value is dynamically switched according to whether there is an object in the vicinity of the touch panel 110. Therefore, the detection accuracy of Hover according to a minute variation in capacitance can be increased. Further, it is possible to shorten the recovery time of the base line value to set the difference (Diff) from the electrostatic capacitance (Raw) of the electrostatic capacitive sensor to an appropriate value.

Figure 6:
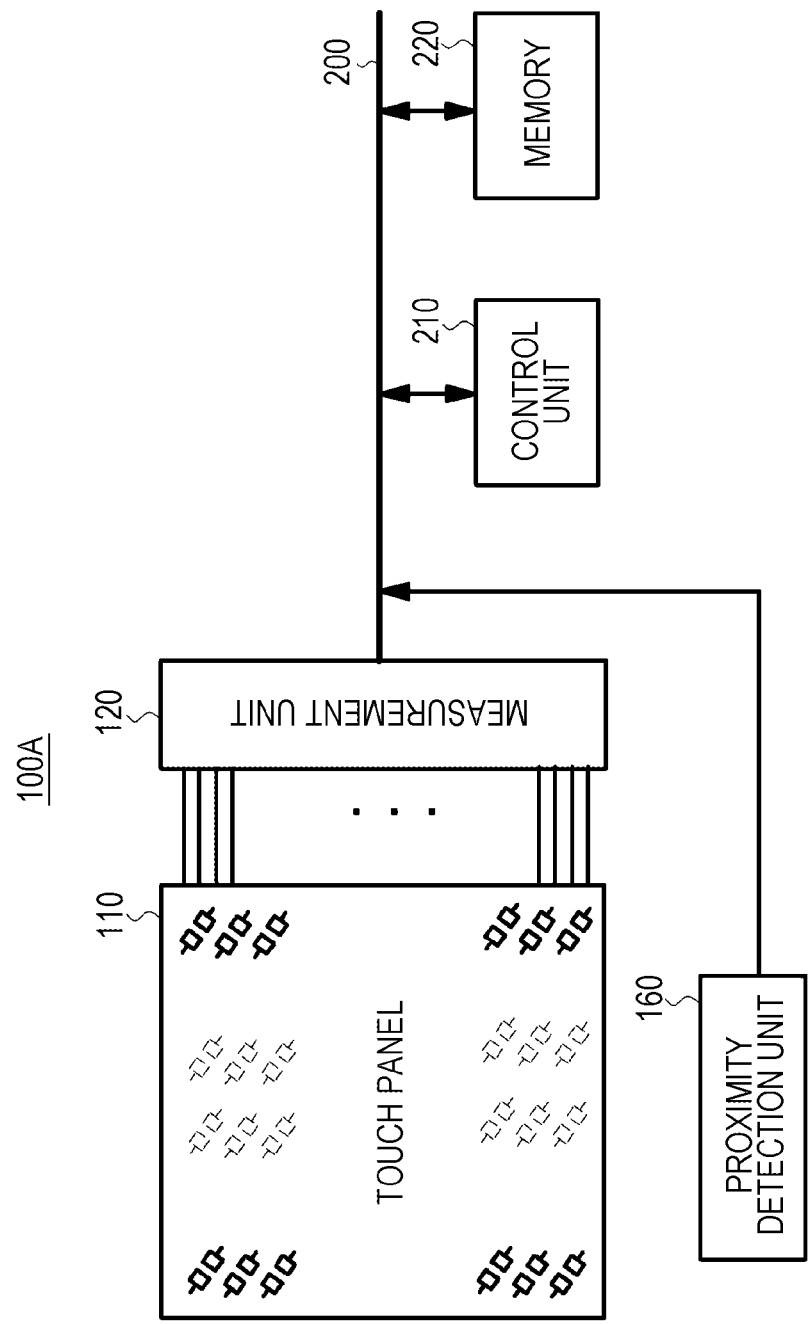
FIG. 6 is a diagram illustrating a configuration of a touch panel device according to a second embodiment of the invention.

Next, a second embodiment of the invention will be described. FIG. 6 is a diagram illustrating a configuration of a touch panel device according to the second embodiment of the invention, and the same components as those of the first embodiment will use the same numbering. As illustrated in the drawing, a touch panel device 100A is configured to include the touch panel 110, the measurement unit 120, the proximity detection unit 160, an internal bus 200, a control unit 210, and a memory 220. The internal bus 200 connects the measurement unit 120, the proximity detection unit 160, the control unit 210, and the memory 220 to each other, and enables data transfer between the units.

In this embodiment, the control unit 210 is configured to include, for example, a microprocessor or a microcontroller which includes a ROM and a RAM. The control unit 210 performs a touch detection program to control the operation of the touch panel device 100A. The touch detection program is stored in the memory 220. When the touch panel device 100A operates, the control unit 210 loads the touch detection program from the memory 220 and performs the program.

Figure 7:
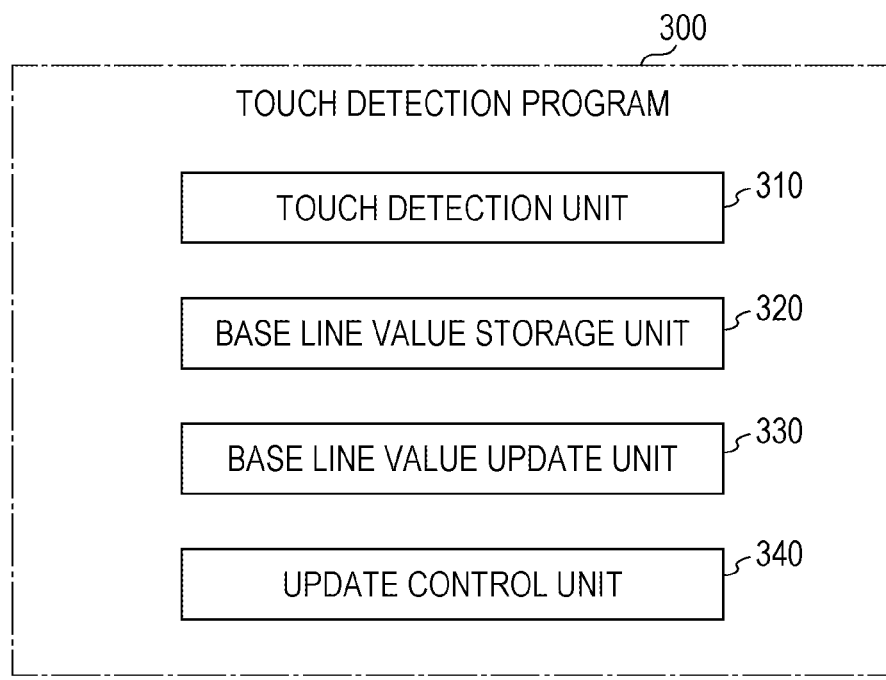
FIG. 7 is a diagram illustrating a functional configuration of a touch detection program according to the second embodiment of the invention.

FIG. 7 illustrates a functional configuration of the touch detection program. A touch detection program 300 includes a touch detection unit 310, a base line value storage unit 320, a base line value update unit 330, and an update control unit 340. These functions are substantially equal to the touch detection unit 130, the base line value storage unit 140, the base line value update unit 150, and the update control unit 170 of the first embodiment.

Figure 8:
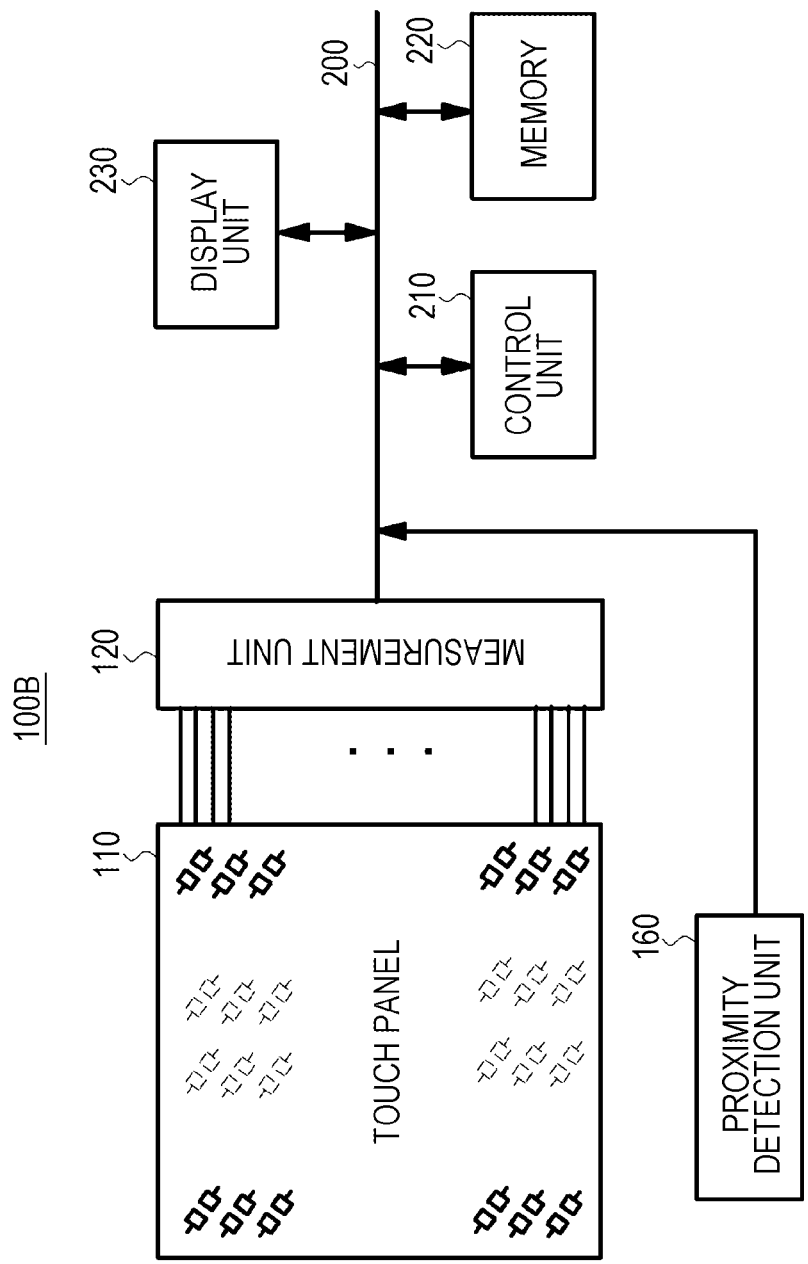
FIG. 8 is a diagram illustrating a configuration of a touch panel device according to a third embodiment of the invention.

Next, a third embodiment of the invention will be described. FIG. 8 is a diagram illustrating a configuration of a touch panel device according to the third embodiment. In this embodiment, the detection result of the proximity detection unit 160 is used in the control of the update speed of the base line value, and also used in the display control of the display unit. A touch panel device 100B of this embodiment includes a display unit 230 in addition to the configuration of the second embodiment. The display unit 230 is, for example, a liquid crystal panel. The touch panel 110 is combined with the liquid crystal panel.

The control unit 210 has a function of controlling the display unit 230 on the basis of the detection result of the proximity detection unit 160. For example, when an approaching object is detected by the proximity detection unit 160, the control unit 210 reads required image data from the memory 220 and displays the data in the display unit 230 according to the usage of the touch panel 110 or in order to make the usage valid. For example, if an approaching object is detected by the proximity detection unit 160, a menu screen for the user interface is displayed in the display unit 230 in response to the detection, or a screen of a user input for a desired operation is displayed. Simultaneously, the update control unit 340 outputs the update control signal to the base line value update unit 330 to set the update speed to be slow. In addition, if an approaching object is not detected, the screen for the user interface of the display unit 230 is switched to another screen, and at the same time the update control unit 340 outputs the update control signal to the base line value update unit 330 to set the update speed to be fast.

As described above, according to the first to third embodiments, the update speed of the base line value is dynamically switched on the basis of the detection result of the proximity detection unit 160. Therefore, it is possible to recover the base line value in a short time period without sacrificing the approaching performance such as Hover compared to the touch panel device of the related art. As an example, in a case where the touching continues one minute immediately after the cold start of the touch panel device, it is possible to shorten the recovery time of the base line value by $1/12$ (a case where the variation $\Delta$ is added or subtracted every 12 milliseconds at the slow time, and the variation $\Delta$ is added or subtracted every 1 millisecond at the fast time) compared to a conventional product.

In the above embodiments, a touch panel device has been described, but it is a matter of course that the touch panel device can be applied to user interfaces of various electronic devices which include a display device such as a liquid crystal panel or an organic EL panel.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic device which is equipped with a touch panel, comprising:
   a plurality of electrostatic capacitive sensors which are disposed in the touch panel, an electrostatic capacitance of which varies as an object comes close or comes into contact;
   a measurement unit configured to measure the electrostatic capacitance of an electrostatic capacitive sensor;
   a first detection unit configured to detect whether the object comes close or comes into contact on the basis of a difference between a measurement value of the measured electrostatic capacitance and a base line value;
   an update unit configured to update the base line value to cause the base line value to follow the measurement value of the electrostatic capacitance of the electrostatic capacitive sensor to correct a variation in electrostatic capacitance of the electrostatic capacitive sensor;
   a second detection unit configured to detect an approaching object to the touch panel; and
   a control unit configured to control an update speed of the update unit on the basis of a detection result of the second detection unit;
   wherein the control unit sets the update speed of the base line value by the update unit to a slow speed that is less than a certain value when the second detection unit detects an approaching object.

2. The electronic device according to claim 1, wherein the control unit sets the update speed of the base line value by the update unit to a fast speed that is greater than the certain value when the second detection unit does not detect an approaching object.

3. The electronic device according to claim 2, wherein the control unit further sets the update speed of the base line value by the update unit to the fast speed when a number of times of non-detection of the object by the second detection unit reaches a certain number.

4. The electronic device according to claim 1, wherein the control unit sets the update speed of the base line value by the update unit to a slow speed that is less than the certain value as an initial setting.

5. The electronic device according to claim 1, wherein the update unit stops the updating of the base line value during a period when the first detection unit performs detection of the object which comes close or comes into contact, and
   wherein the control unit sets the update speed of the base line value by the update unit to a slow speed that is less than the certain value after the detection by the first detection unit is performed, and switches the update speed from the slow speed to a fast speed that is greater than the certain value when the second detection unit does not detect the object.

6. The electronic device according to claim 1, wherein an inclination of the base line value when the update speed is set to be less than the certain value is less than the inclination of the base line value when the update speed is set to be greater than the certain value.

7. The electronic device according to claim 1, wherein a second distance from the touch panel at which the second detection unit is possible to detect is larger than a first distance from the touch panel at which the first detection unit is possible to detect.

8. The electronic device according to claim 1, wherein the second detection unit detects an approaching object by an infrared sensor which includes a light-emitting element and a light-receiving element.

9. The electronic device according to claim 1, wherein the second detection unit detects an approaching object from an image captured by an image pickup camera.

10. The electronic device according to claim 1, further comprising
    a display unit configured to display an image related to the touch panel, and wherein the control unit controls the image to be displayed by the display unit on the basis of the detection result of the second detection unit.

11. An update method of a base line value in a touch panel in which a plurality of electrostatic capacitive sensors are disposed and an electrostatic capacitance of an electrostatic capacitive sensor varies as an object comes close or comes into contact, comprising:
- a step of measuring the electrostatic capacitance of an electrostatic capacitive sensor;
- a first detection step of detecting an object which comes close or comes into contact on the basis of a difference between a measurement value of the measured electrostatic capacitance and the base line value;
- a step of updating the base line value at a certain value of update speed by causing the base line value to follow the measurement value of the electrostatic capacitance of the electrostatic capacitive sensor to correct a variance in electrostatic capacitance of the electrostatic capacitive sensor;
- a second detection step of detecting an approaching object to the touch panel; and
- a step of controlling the update speed of the base line value on the basis of a detection result of the second detection step;

wherein, in the controlling step, the update speed of the base line value is less than the certain value when an approaching object is detected in the second detection step.

12. The update method according to claim 11,
wherein, in the controlling step, the update speed of the base line value is greater than the certain value when an approaching object is not detected in the second detection step.

13. The update method of the base line value according to claim 11,
wherein, in the updating step, the updating of the base line value is stopped during a period when an object coming close or coming into contact is being detected by the first detection step, and
wherein, in the controlling step, the update speed of the base line value is set to a slow speed that is less than the certain value after the detection by the first detection step, and the setting of the update speed is switched from the slow speed to a fast speed that is greater than the certain value when non-detection of the object occurs in the second detection step.

14. The update method of the base line value according to claim 11,
wherein a detection distance from the touch panel of the second detection step is larger than a detection distance from the touch panel of the first detection step.

* * * * *